(12) United States Patent
Garcia-Teijeiro et al.

(10) Patent No.: US 11,402,540 B2
(45) Date of Patent: Aug. 2, 2022

(54) COUPLED RESERVOIR-GEOMECHANICAL MODELS USING COMPACTION TABLES

(71) Applicant: Schlumberger Technology Corporation, Sugar Land, TX (US)

(72) Inventors: Xavier Garcia-Teijeiro, Wokingham (GB); Adrian Rodriguez Herrera, London (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 561 days.

(21) Appl. No.: 16/465,572

(22) PCT Filed: Dec. 1, 2017

(86) PCT No.: PCT/US2017/064291
§ 371 (c)(1),
(2) Date: May 31, 2019

(87) PCT Pub. No.: WO2018/102732
PCT Pub. Date: Jun. 7, 2018

(65) Prior Publication Data
US 2020/0096671 A1 Mar. 26, 2020

Related U.S. Application Data

(60) Provisional application No. 62/428,927, filed on Dec. 1, 2016.

(51) Int. Cl.
*G06G 7/48* (2006.01)
*G01V 99/00* (2009.01)
*G01V 1/34* (2006.01)

(52) U.S. Cl.
CPC ............ *G01V 99/005* (2013.01); *G01V 1/345* (2013.01); *G01V 2210/646* (2013.01); *G01V 2210/663* (2013.01)

(58) Field of Classification Search
CPC .... G01V 1/34; G01V 1/345; G01V 2210/646; G01V 2210/663; G01V 99/005;
(Continued)

(56) References Cited

U.S. PATENT DOCUMENTS 7,177,764 B2 * 2/2007 Stone ..................... G01V 11/00
702/6
10,571,605 B2 * 2/2020 Crawford ............. G01V 99/005
(Continued)

OTHER PUBLICATIONS

David, Christian, et al. "Laboratory measurement of compaction-induced permeability change in porous rocks: Implications for the generation and maintenance of pore pressure excess in the crust." pure and applied geophysics 143.1 (1994): 425-456.*
(Continued)

*Primary Examiner* — Rehana Perveen
*Assistant Examiner* — Nithya J. Moll

(57) ABSTRACT

Systems, methods, and computer readable media, of which the method includes calculating strains, stresses, or both resulting from pressure changes in a subterranean volume using a geomechanical model, determining one or more local correlations between pressure changes and changes in permeability, porosity, or both in the subterranean volume using the calculated strains and stresses, generating one or more compaction tables for the subterranean volume using the local correlations, calculating pressure changes in the subterranean volume by simulating fluid flow in the subterranean volume using a reservoir model, and modifying the reservoir model using the one or more compaction tables and the calculated pressure changes.

22 Claims, 9 Drawing Sheets

(58) Field of Classification Search
CPC .......... G01B 11/06; G01B 11/26; G01D 5/36; G05B 19/054; G05B 2219/37224; G06F 13/20

See application file for complete search history.

(56) References Cited

U.S. PATENT DOCUMENTS

| | | |
|---|---|---|
| 2002/0169559 A1 | 11/2002 | Onyia et al. |
| 2009/0276156 A1 | 11/2009 | Kragas et al. |
| 2010/0217563 A1* | 8/2010 | Montaron ............... E21B 47/00 703/1 |
| 2010/0254217 A1 | 10/2010 | Chu et al. |
| 2011/0120718 A1* | 5/2011 | Craig ...................... E21B 43/16 166/308.1 |
| 2011/0141851 A1 | 6/2011 | Kacewicz et al. |
| 2015/0066459 A1 | 3/2015 | Flemings et al. |
| 2016/0070024 A1* | 3/2016 | Berard ................. G01V 99/005 703/10 |
| 2016/0131800 A1* | 5/2016 | Pecher ................... E21B 49/00 703/10 |

OTHER PUBLICATIONS

Settari, A. "Reservoir compaction." Journal of petroleum technology 54.08 (2002): 62-69.*

Settari, Antonin, and Dale A. Walters. "Advances in coupled geomechanical and reservoir modeling with applications to reservoir compaction." Spe Journal 6.03 (2001): 334-342.*

International Search Report and Written Opinion for the equivalent International patent application PCT/US2017/064291 dated Mar. 14, 2018.

International Preliminary Report on Patentability for the equivalent International patent application PCT/US2017/064291 dated Jun. 13, 2019.

* cited by examiner

COUPLED RESERVOIR-GEOMECHANICAL MODELS USING COMPACTION TABLES

CROSS-REFERENCE TO RELATED APPLICATIONS

This application claims priority to U.S. Provisional Patent Application having Ser. No. 62/428,927, which was filed on Dec. 1, 2016, and is incorporated herein by reference in its entirety.

BACKGROUND

When an oil/gas reservoir is exploited, the original in-situ pressure in the reservoir may be altered. Production, for example, can lead to a decrease in the in-situ pressure, which can in turn lead to the deformation of the rock inside depleted areas within the reservoir and beyond. As the rock deforms, the state of stress can change across the reservoir and, in response, the natural fractures present in the rock can potentially close. For a reservoir where the hydrocarbon flow is mainly through the natural fractures, this could result in a decrease of permeability and secondary porosity, which may affect production.

In reservoir simulation, the permeability, porosity, and other properties of rock in a reservoir can be used to determine production levels. Thus, effectively and efficiently accounting for changes in permeability, porosity, etc. due to simulated production in a reservoir model improving, for example, simulation accuracy and efficiency.

SUMMARY

Embodiments of the disclosure may provide a method of modeling a subterranean volume, the method including obtaining data representing one or more physical characteristics of the subterranean volume, and generating a reservoir model of the subterranean volume using the data. The geomechanical model represents one or more geomechanical characteristics of the subterranean volume. The method also includes calculating strains, stresses, or both resulting from pressure changes in the subterranean volume using the geomechanical model, determining one or more local correlations between pressure changes and changes in permeability, porosity, or both in the subterranean volume using the calculated strains and stresses, generating one or more changes in the subterranean volume by simulating fluid flow in the subterranean volume using a reservoir model, and modifying the reservoir model using the one or more compaction tables and the calculated pressure changes.

In some embodiments, the compaction tables relate pressure to porosity and/or permeability in individual cells or groups of cells in the reservoir model of the subterranean volume.

In some embodiments, the one or more local correlations are specified for individual cells of the subterranean volume in the geomechanical model, the reservoir model, or both.

In some embodiments, the method also includes again simulating fluid flow in the subterranean volume using the modified reservoir model.

In some embodiments, the data is collected using one or more physical devices positioned in a well or on a surface proximal to the subterranean volume.

In some embodiments, the one or more local correlations represent a relationship between pressure depletion, normal strain ($\varepsilon n$), and shear strain ($\varepsilon s$) in the subterranean volume.

In some embodiments, determining the one or more local correlations includes calculating the derivatives of strain verses pressure using the formula: $\varepsilon ndot = \varepsilon n/Dp$ and $\varepsilon sdot = \varepsilon s/Dp$, where $Dp$ is pressure change, and wherein $\varepsilon ndot$ and $\varepsilon sdot$ are the slopes of the normal strain and shear strain, respectively, over pressure.

In some embodiments, determining the one or more local correlations further comprises calculating normal strain and the shear strain of fractures using the formula: $\varepsilon n = \varepsilon ndot(P-Po)$ and $\varepsilon s = \varepsilon sdot(P-Po)$, where $P$ is pressure and $Po$ is an initial pressure for which the apertures of the fractures are known.

In some embodiments, determining the one or more local correlations further comprises predicting changes in pressure using the formula: $\Delta a(P) = f(\varepsilon ndot)(P-Po) + g(\varepsilon sdot)(P-Po)$, where $f$ and $g$ are functions relating changes in the normal strain and the shear strain to the changes in aperture.

In some embodiments, predicting the changes in aperture comprises predicting changes in pressure depletion using the formula: $\Delta a(Dp) = sDp \ (\varepsilon ndot * \varepsilon n + theta(phi) * \varepsilon sdot * \varepsilon s)$, where $s$ is a characteristic spacing of discontinuities, phi is the dilation angle, and theta(phi) is a function that depends on cumulated strain and describes an effective dilation of one or more fractures.

In some embodiments, computing the permeability changes comprises employing a cubic law for permeability-aperture in planar fractures.

Embodiments of the disclosure may further provide a non-transitory computer-readable medium storing instructions that, when executed by at least one processor of a computing system, cause the computing system to perform operations. The operations include obtaining data representing one or more physical characteristics of a subterranean volume, and generating a geomechanical model of the subterranean volume using the data. The geomechanical model represents one or more geomechanical characteristics of the subterranean volume and one or more fluid flow characteristics of the subterranean volume. The operations also include calculating strains, stresses, or both resulting from pressure changes in the subterranean volume using the reservoir model, determining one or more local correlations between pressure changes and changes in permeability, porosity, or both in the subterranean volume using the calculated strains and stresses, generating one or more compaction tables for the subterranean volume using the local correlations, calculating pressure changes in the subterranean volume by simulating fluid flow in the subterranean volume using a reservoir model, and modifying the reservoir model using the one or more compaction tables and the calculated pressure changes.

Embodiments of the disclosure may further provide a computing system including one or more processors, and a memory system comprising one or more non-transitory computer-readable media storing instructions that, when executed by at least one of the one or more processors, cause the computing system to perform operations. The operations include obtaining data representing one or more physical characteristics of a subterranean volume, generating a geomechanical model of the subterranean volume using the data. The geomechanical model represents one or more geomechanical characteristics of the subterranean volume. The operations also include calculating strains, stresses, or both resulting from pressure changes in the subterranean volume using the reservoir model, determining one or more local correlations between pressure changes and changes in permeability, porosity, or both in the subterranean volume using the calculated strains and stresses, generating one or more compaction tables for the subterranean volume using the local correlations, calculating pressure changes in the subterranean volume by simulating fluid flow in the subterranean volume using a reservoir model, and modifying the reservoir model using the one or more compaction tables and the calculated pressure changes.

The foregoing summary is provided merely to introduce some of the aspects of the present disclosure and should not be considered limiting or exhaustive.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

Reference will now be made in detail to embodiments, examples of which are illustrated in the accompanying drawing and figure. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

The terminology used in the description of the invention herein is for the purpose of describing particular embodiments and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
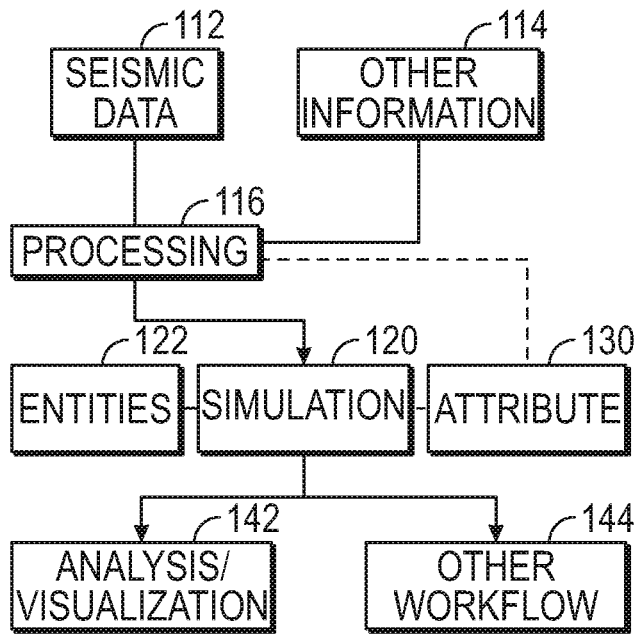
FIG. 1 illustrates an example of a system that includes various management components to manage various aspects of a geologic environment, according to an embodiment.
Figure 1:
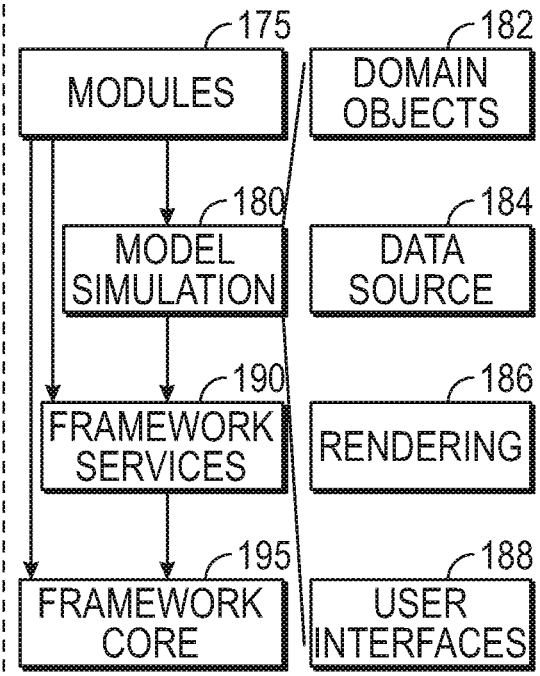
Figure 1:
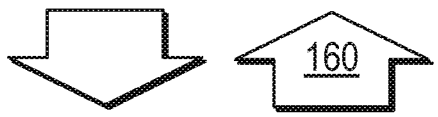
Figure 1:
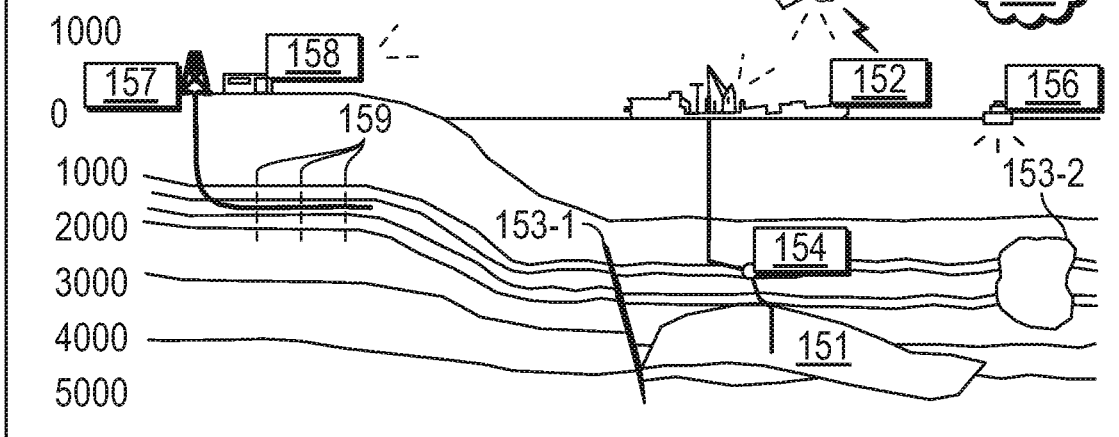

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide tor selection of one or more predefined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2A:
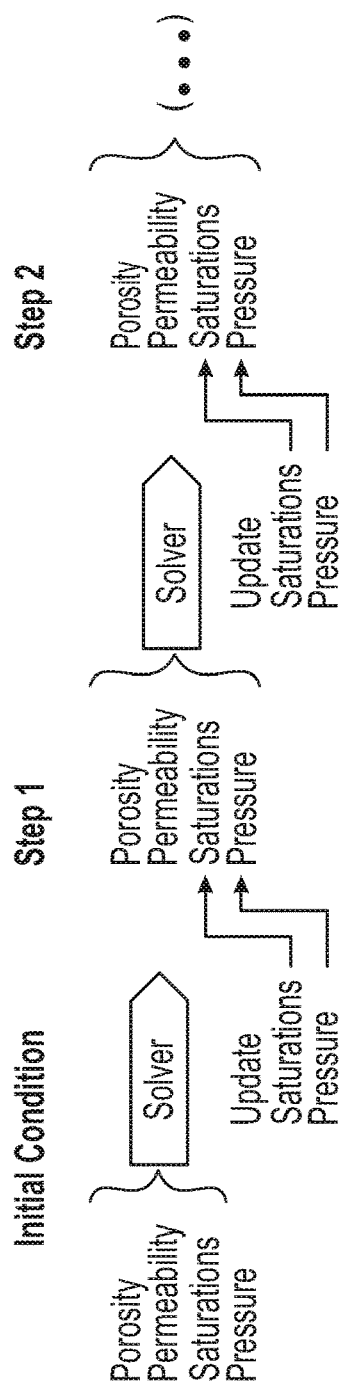
FIG. 2A illustrates an example one-way coupling diagram, according to an embodiment.

In numerical modeling of flow and hydrocarbon recovery there are several options for accounting or not accounting for potential changes in permeability rock porosity, and other properties during production. For example, in a simple approximation, flow and production in the reservoir can be modeled without accounting for potential changes in the permeability of the fractured rock during production. Namely, hydrocarbon production and pressure changes in the reservoir are estimated on the basis of the initial hydraulic properties of the reservoir rock (e.g., porosity, saturations, and permeability) and operational parameters, such as bottom-hole pressure controls. Within this approach, fractures opening/closure during production may be disregarded. This approach can be efficient in terms of time and computational requirements but neglects the potential effects of pressure drawdown on future production. FIG. 2A shows a one-way coupling, where the flow solver departs from an initial condition and given hydraulic properties (e.g., permeability, porosity, and saturations) and advances the solutions in time for the produced volumes, pressure, and saturations, without necessarily considering potential changes in time of the permeability and porosity due to production.

As another example, a fully two-way coupled process can be modeled. Here, changes in pressure due to production can be first estimated by a reservoir model. These changes can then be fed to a geomechanics calculation in which the changes in stress and the rock deformation are estimated. Such information can then be used to estimate the opening/closure of the natural fractures and its impact on the local pore volume and permeability. The information derived from the geomechanics calculation can then be fed back to the reservoir model to compute a new state of pressures and produced volumes while accounting for the permeability/porosity changes in a previous step. Such an approach may be more accurate than the simple approximation, but it may also be more computationally expensive than the simple approximation because the geomechanics calculations are added on top of the reservoir flow ones. The skill set to execute the workflow is also higher since it involves the coupling of a numerical model of the reservoir flow and its geomechanical characteristics, which are typically two different domains of knowledge.

Figure 2B:
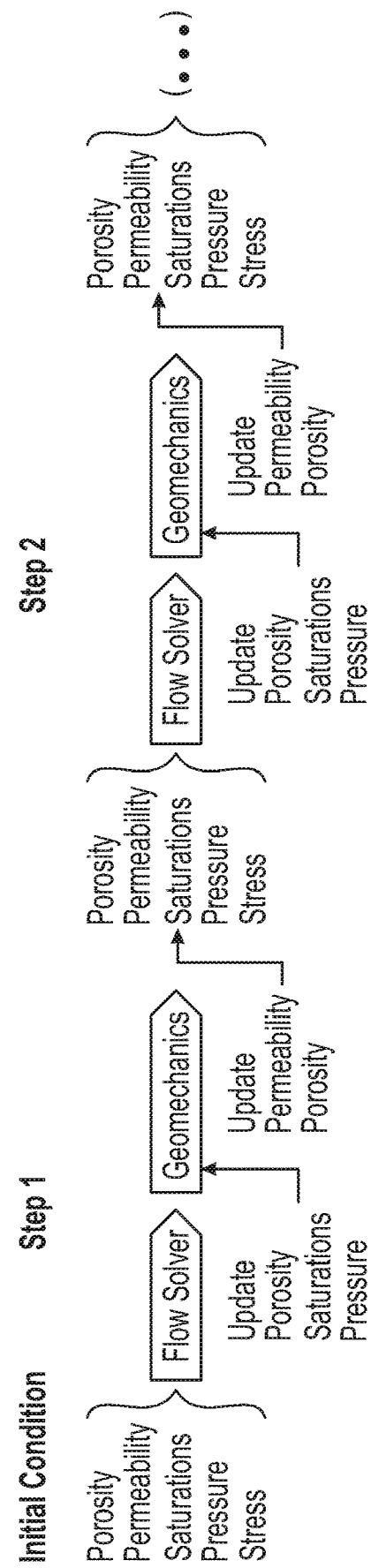
FIG. 2B illustrates an example two-way coupling diagram, according to an embodiment.

FIG. 2B shows a two-way coupling, where the solver departs form an initial condition and given hydraulic properties (e.g., porosity, permeability, and saturations) and geomechanical properties (e.g., stress, compliance of a fracture, rock mass mechanical properties, and strength properties). The flow solver updates the produced volumes pressures and saturations. The output from the flow solver serves to compute changes in porosity and permeability via geomechanical calculations. The newly computed hydraulic properties serve as input for the next step of calculation in which the permeability and porosity changes with pressure are accounted for.

Here, the solutions depart from an in-situ condition of stress, pressure, permeability, saturations, and porosities. The reservoir model updates the hydraulic variables on the basis of the input values and the geomechanics calculation updates the rest of the parameters including the stress state, the deformation of the rock, and the conductivity of the natural fractures. The new state of parameters, which include an updated porosity and permeability, can then be consumed by the reservoir calculation, thus advancing the solutions in time.

In between the two options mentioned above, there is also the possibility of a pseudo-coupling. Here, the potential opening/closure of the natural fractures and its impact on the reservoir permeability can be fed to the reservoir model at each stage, just as in the two-way coupled approach. However, in this case, there may not be a geomechanics calculation involved and, instead, empirical correlations relating pressure changes and permeability, named "Compaction Tables," can be used. This method may be economical in terms of computational resources used but may rely on an appropriate choice of the correlations relating pressure changes to permeability changes. A drawback of this approach is that the adequate compaction tables to use are not known a priori and empirical correlations, intuition criteria, and operator criteria prevail in the construction and testing of the pressure-permeability correlations used in the modeling.

Embodiments described herein extend the pseudo-coupling approach described above by allowing a physics-based selection of the compaction tables. Embodiments can be utilized without further expertise and with relatively little extra computational power and time.

The methodology proposed herein can start with a numerical representation of the subsurface in terms of its mechanical properties and distribution of fractures, e.g., a geomechanical model. The mechanical properties may include the Young's modulus and Poisson's ratio or any combination of the elastic properties of materials that can completely define its elastic response to applied loads. These properties can be derived from log data, seismic inversion or lab tests. The mechanical properties might also include strength properties such as the compressional and shear strength of the rock, friction angle, etc. These properties may be derived from measurements taken, or directly measured, using downhole tools, surface measurement devices (e.g., geophones), and/or the like.

The method can also use an initial numerical representation of the natural fractures in the rock. This may be derived from statistical Discrete Fracture Network Models (DFN), well log imagery, or forward modeling, among other techniques. A model for the stiffness of the fractures or the stiffness of the fractured rock can also be used together with the strength properties of the discontinuities, such as their friction angle, and frictional strength coefficient.

The response to pressure changes of a model rock, described by the aforementioned parameters, is then evaluated. For this purpose, the method can involve computing in three dimensions (3D) the strains and stresses resulting from pressure changes in the model rock. In an embodiment, the pressure may be assumed to decrease (depletion) evenly across the reservoir from an initial step with a uniform pressure distribution. The 3D solutions for the stress and strains are obtained for the prescribed change in pressure.

Figure 3:
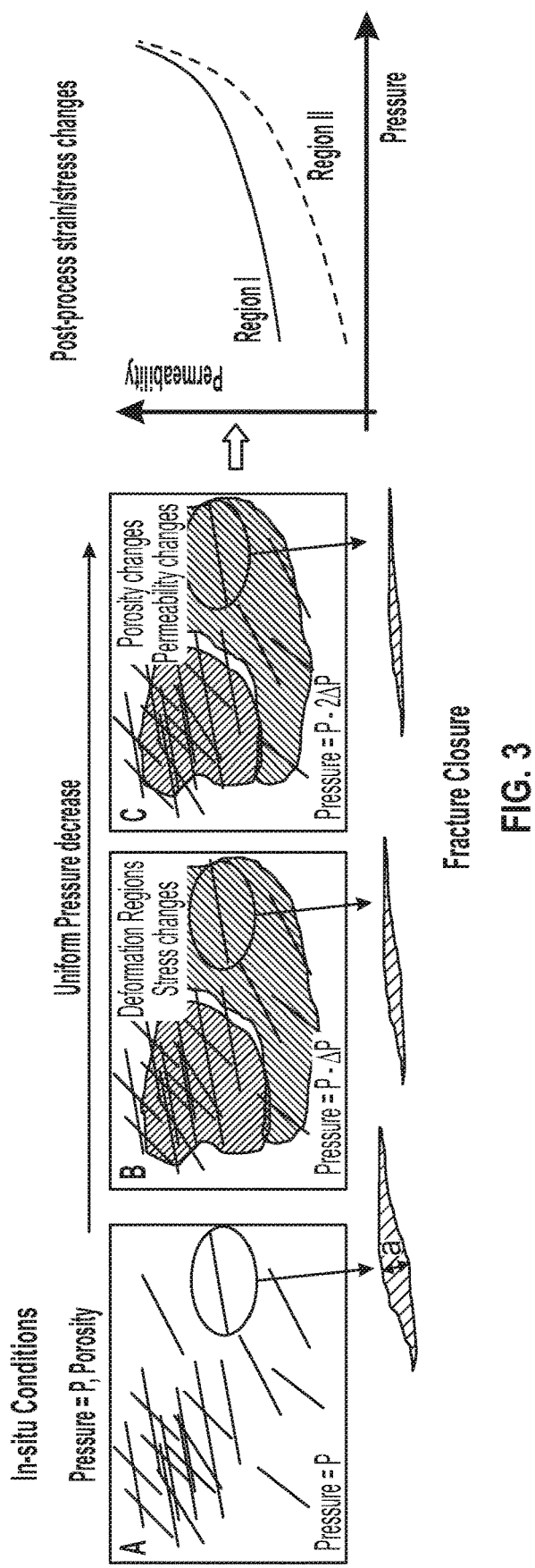
FIG. 3 illustrates an example procedure for obtaining geomechanics-driven compaction tables, according to an embodiment.

Having the solutions for the full strain tensor in 3D due to the prescribed uniform change in pressure ΔP, a local correlation can be obtained across the model between pressure depletion and induced changes in permeability and porosity. Such results can be gathered in the form of a correlation among the three quantities. FIG. 3 illustrates an example procedure for obtaining geomechanics-driven compaction tables.

The proposed method may directly capture the heterogeneities in the distribution of properties or fracture density in the geomechanics calculation, which may produce compaction tables for different regions across the reservoir. The obtained correlations can then be used in the schema shown in FIG. 4. The schema demonstrates a use of the geomechanics-driven compaction tables in a pseudo-coupling methodology. As shown, the geomechanical calculation is performed in advance and stored in the form of compaction tables.

Figure 4:
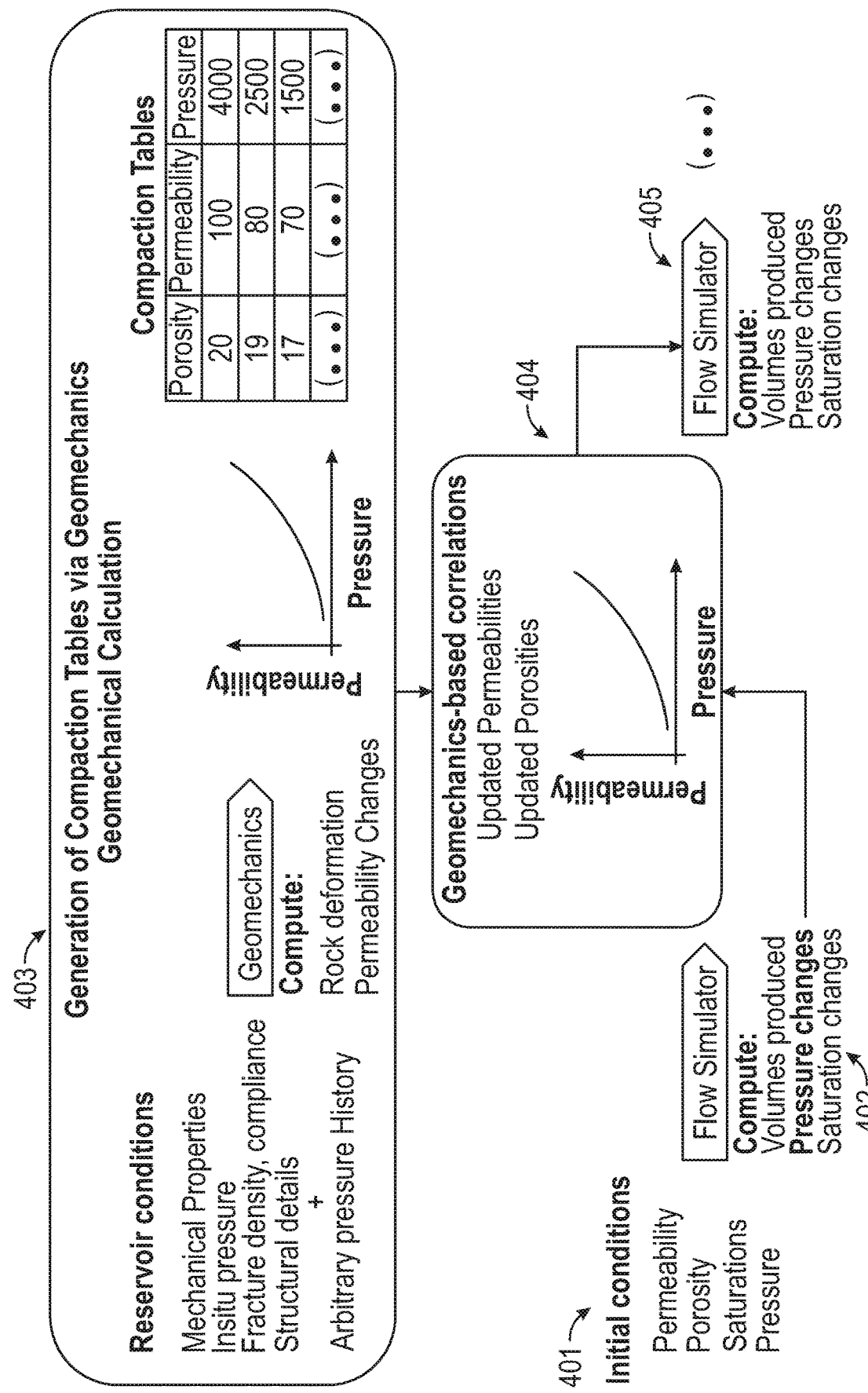
FIG. 4 illustrates an example process for using geomechanics-driven compaction tables in a pseudo-coupling methodology, according to an embodiment.

In particular, as shown in FIG. 4, at stage 401, initial conditions such as permeability, porosity, saturations, and reservoir pressure are received as input. These may be based on measurements taken in or around a well or at a surface proximal to the subterranean volume, and represent physical characteristics of the subterranean volume. A reservoir model may represent the subterranean volume and be configured to receive and represent (or provide) these initial conditions.

At stage 402, the fluid flow in the subterranean volume may be simulated for a first time step, resulting in the computation of volumes of fluid (e.g., hydrocarbons) produced from the reservoir, pressure changes in the reservoir, and/or saturation changes in the subterranean volume.

At stage 403, the compaction tables may be generated via geomechanical calculations using a geomechanical model, as will be described in greater detail below. In general, however, reservoir conditions may be employed along with pressure history in order to calculate a correlation between pressure, porosity, and permeability, which may be organized as a compaction table. The compaction table may represent the degree to which fractures can be expected to close (changing the porosity and/or permeability) in response to changing pressure.

At stage 404, the compaction tables may be fed to the reservoir model, and used to change the reservoir model. The changing porosity and/or permeability (geomechanical properties) may affect the rate at which fluid flows in the subterranean volume. Accordingly, at stage 405, another simulation of fluid flow may be conducted, e.g., for a second time step, which may take into consideration the changed geomechanical properties by using the reservoir model that is modified according to the compaction tables. This process may repeat, with the fluid flow model being modified each time using the same (or potentially updated) compaction tables, thereby accounting for the geomechanical changes that occur during production potentially without having to run a geomechanical calculation for the subterranean volume for each time step.

Figure 5A:
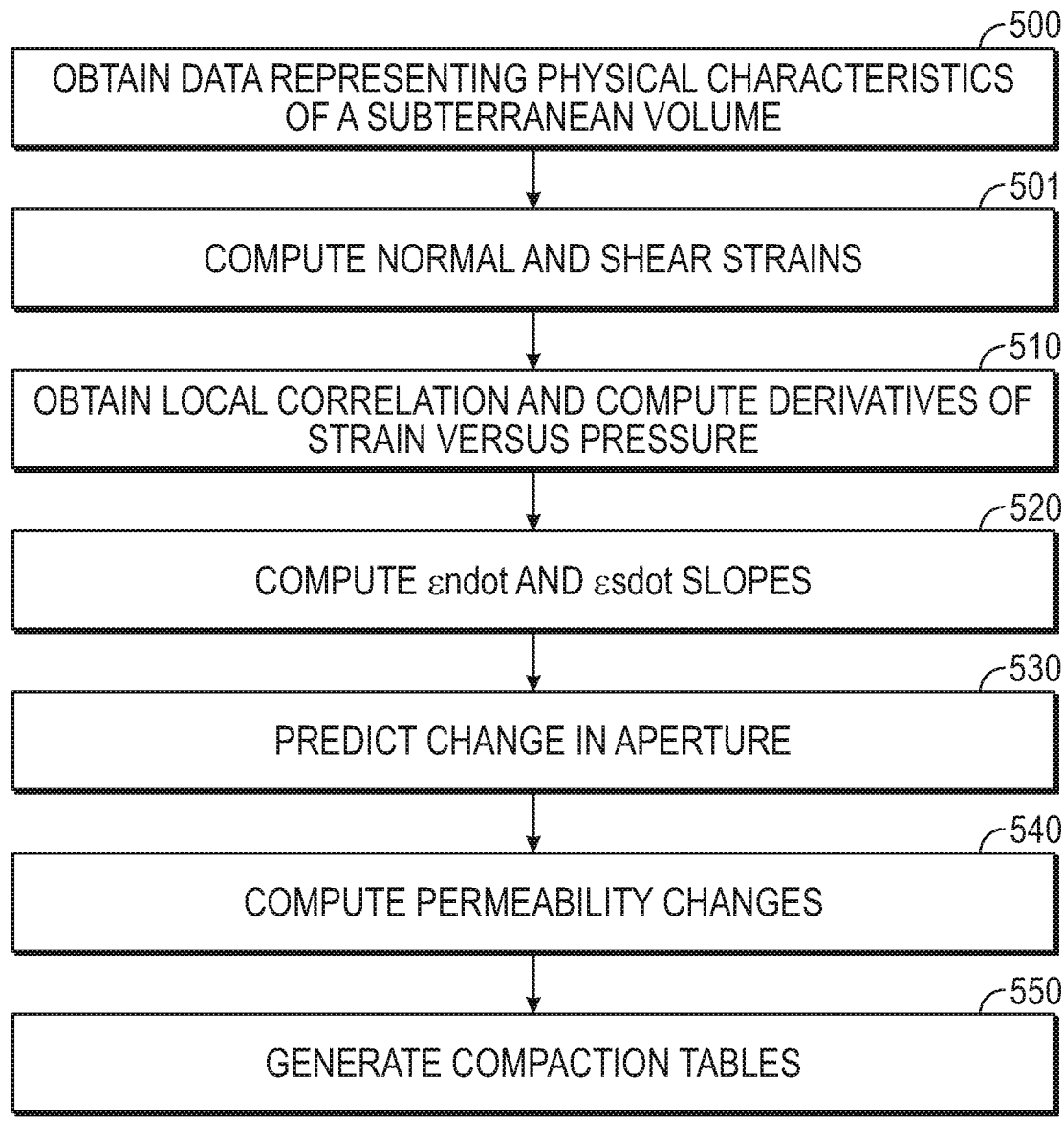
FIG. 5A illustrates a flowchart of a method for generating geomechanics-based compaction tables, according to an embodiment.

FIG. 5A illustrates an example flow diagram for generating geomechanics-based compaction tables, according to an embodiment. At 500, data may be obtained, e.g., from physical collection devices located in a wellbore or on the surface. In some embodiments, the method may include acquiring this data in the field, but in other embodiments, the data may be retrieved from data storage or another source. The data may represent one or more physical characteristics of the subterranean volume, which may include a reservoir with one or more fractures (e.g., a fracture network). From this data, one or more models of the subterranean volume, including the reservoir and/or its fractures, can be generated, e.g., one or more geomechanical models. Using the geomechanical model, the normal and shear strains of the fractures can be computed, as at 501.

In some embodiments, slopes of the relationships for normal and shear strain may be generally valid for any change in pressure in the reservoir (linear response). Hence, in 510, the normal and shear strains of the fractures can be computed for any pressure P as $\varepsilon n=\varepsilon ndot(P-Po)$ and $\varepsilon s=\varepsilon sdot(P-Po)$, where Po is an initial pressure for which the apertures of the fractures are known.

Continuing in 510, a local correlation can be obtained and the derivatives of the strain verses pressure can be computed. Having the solutions for the full strain tensor in 3D due to the prescribed change in pressure ΔP, the local correlation can be obtained across the model between pressure depletion, normal strain ($\varepsilon n$), and shear strain ($\varepsilon s$) of the discontinuities $\varepsilon n$, $\varepsilon s$ across the model. This information can then be used to compute the derivatives of the strain versus pressure as: $\varepsilon ndot=\varepsilon n/Dp$ and $\varepsilon sdot=\varepsilon s/Dp$ for the given pressure drop, where Dp is pressure change.

In 520, the $\varepsilon ndot$ and $\varepsilon sdot$ slopes can be computed. The aforementioned slopes $\varepsilon ndot$ and $\varepsilon sdot$ may be local. For example, they may vary across the reservoir depending on the local characteristics of the rock, the density and orientation of the fractures and their relative compliances. In geocellular models, these slopes can be computed for each cell of the model. These slopes can also capture grid dependencies when the solutions were obtained by numerical methods in geo-cellular models.

In 530, the changes in aperture Δa can be predicted. Changes of the fractures across the model for any change in pressure, $\Delta a(P)=f(\varepsilon ndot)(P-Po)+g(\varepsilon sdot)(P-Po)$ can be computed, where f and g are functions relating the changes in normal and shear strains to the changes in aperture. As an example, a possible combination of such functions is: $\Delta a(Dp)=sDp$ ($\varepsilon ndot*\varepsilon n+theta(phi)*\varepsilon sdot*\varepsilon s$), where s is the characteristic spacing of the discontinuities, phi is the dilation angle, and theta(phi) is a function that can depend on the cumulated strain $\varepsilon s$ and describes the effective dilation of the fractures. In such a way, the second term might tend to zero if the fractures are opening (pressure increases) and might take finite values when shearing occurs when enough normal strain has been cumulated to bring the fracture surfaces closer than a prescribed threshold. Thus, the presence of asperities can be accounted for.

In 540, permeability changes can be computed from the changes in aperture for any pressure change Dp, while assuming any suitable model linking aperture-permeability. An example of such model can be the cubic law for permeability-aperture in planar fractures $K=(a^2)/12$, yet the ultimate form of the model of permeability-aperture can vary in different embodiments.

In 550, the compaction tables can be generated. The permeability changes computed in 540 can be used as compaction tables, as derived from numerical modeling, accounting for the particular characteristics of the rock and the in-situ fractures. The compaction tables can be used in reservoir simulation to efficiently and dynamically determine permeability and porosity of rock in the reservoir during production and, thus, production levels can be determined with greater accuracy.

In some embodiments, the compaction tables can be used in simulating "tight" reservoirs, where pressure depletion is common and permeabilities can be due to natural and induced fractures.

Figure 5B:
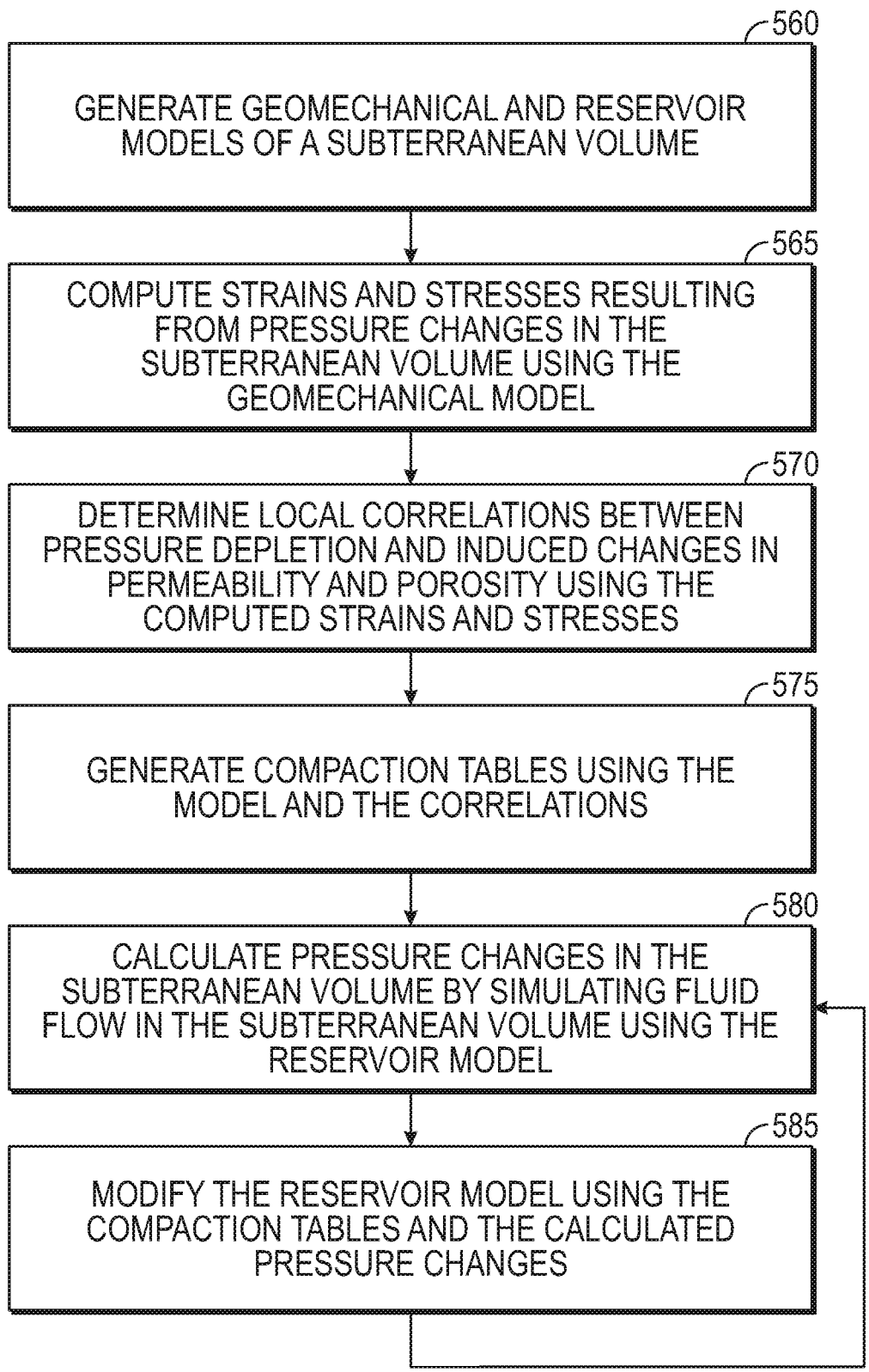
FIG. 5B illustrates a flowchart of a method for modeling a subterranean volume, according to an embodiment.

FIG. 5B illustrates a flowchart of a method for modeling a subterranean volume, according to an embodiment. The method of FIG. 5B may incorporate the compaction tables generated using the method of FIG. 5A in at least some embodiments. As shown, the method 5A may include generating or receiving a geomechanical model of a subterranean volume including (at least some of) its mechanical properties and its distribution of fractures, as at 560. The method may also include receiving or generating a reservoir model that represents fluid flow characteristics in the subterranean volume, such as formation pressure, porosity, permeability, etc., throughout the subterranean volume.

The method may include calculating strains and stresses resulting from the pressure changes in the subterranean volume using the model, as at 565, as described above. The method may then proceed to determining local correlations between pressure depletion and induced changes in permeability and porosity using the computed strains and stresses, as at 570, as described above. The method may also include generating compaction table using the model and the correlations, as at 575.

As graphically depicted in FIG. 4, these compaction tables may be implemented into a flow simulation scheme for modeling the subterranean volume. Accordingly, a flow simulation, e.g., using the reservoir model or a portion thereof, may be conducted in order to calculate pressure changes in the subterranean volume, as at 580. These pressure changes calculated at 580 may impact the fluid flow in the subterranean volume. The compaction tables provide the link between the pressure changes 580, locally, for the fractures or subsets of the fracture network, and the changing fluid flow behavior of the subterranean volume. For example, depletion (decreased pressure) may result in decreased porosity and/or permeability, as shown in the graph in stages 403 and 404 of FIG. 4.

The method may also include modifying the reservoir model using the compaction tables and the calculated pressure changes, as at 585. This process of calculating pressure changes (e.g., using the fluid flow simulation) and then modifying the reservoir model based on the pressure changes correlated to the permeability/porosity in the compaction tables may then be repeated, e.g., using the same compaction tables. Thus, the method may provide for a hybrid technique of simulating fluid flow in a reservoir, which may efficiently link the geomechanical and reservoir fluid flow models. In particular, the fluid flow simulation may be made quicker by avoiding recalculating the geomechanical changes induced by pressure changes, while accuracy is enhanced by considering geomechanical changes resulting from changes in reservoir pressure as provided in the calculated compaction tables. Moreover, accuracy is enhanced by, in some cases, avoiding referring to extrinsic source of information, despite the geomechanical changes being a priori unknown.

Figure 6B:
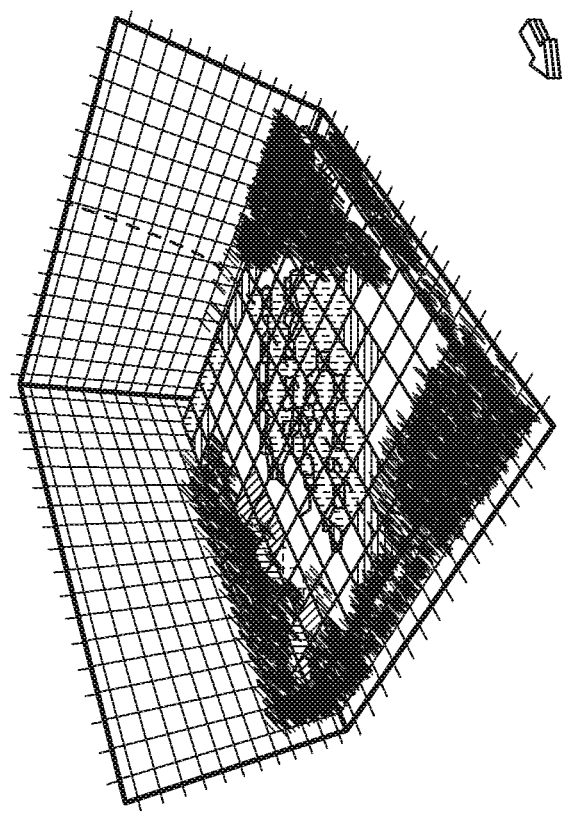
FIG. 6B illustrates an example reservoir model where deformation regions are computed via geomechanics calculations, according to an embodiment.
Figure 6A:
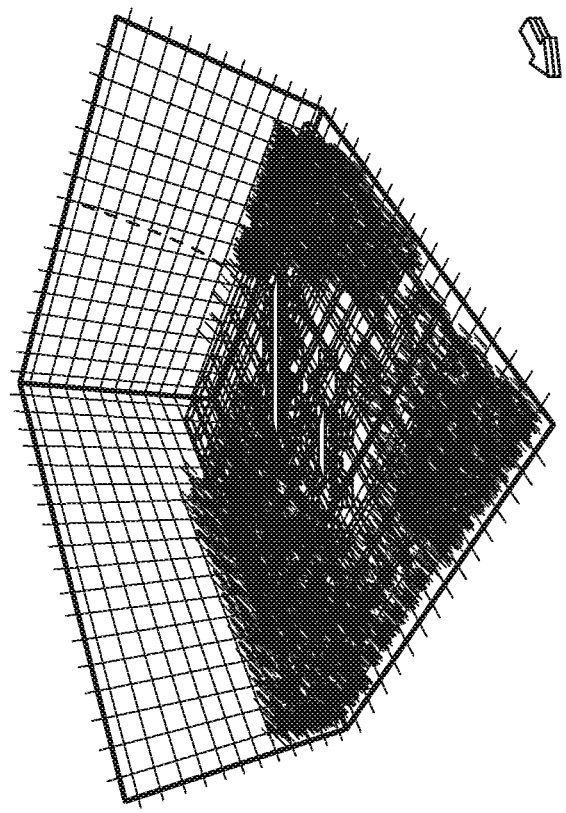
FIG. 6A illustrates an example geocellular reservoir model where density of natural fractures varies across a model, according to an embodiment.

FIG. 6A illustrates an example geocellular reservoir model where density of natural fractures varies across a model. The example geocellular reservoir model can be generated using methods described herein.

FIG. 6B illustrates an example geomechanical model where deformation regions are computed via geomechanics calculations. The example reservoir model can be generated using methods described herein.

Figure 7:
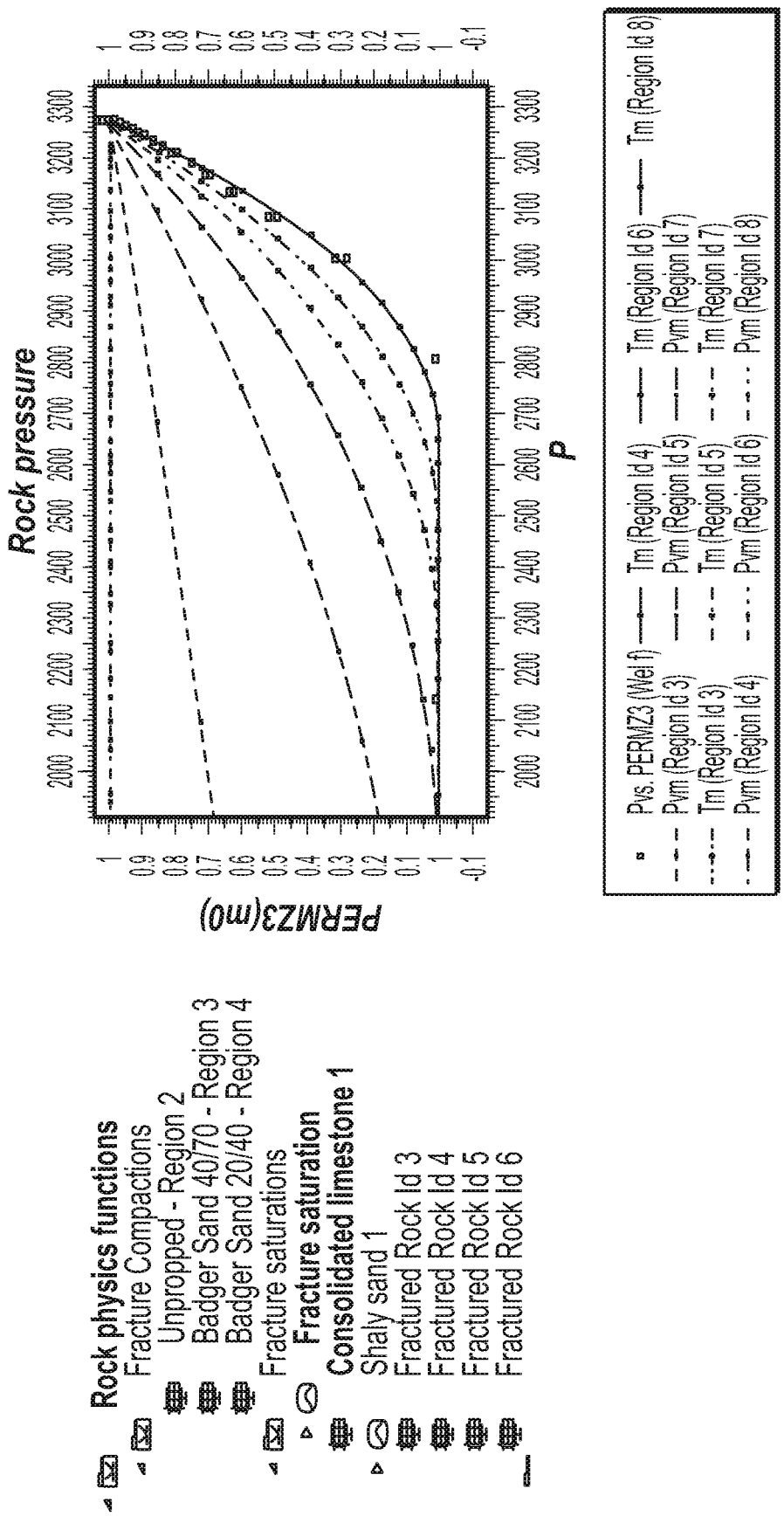
FIG. 7 illustrates an example user interface displaying compaction tables imported into a seismic to simulation software program, according to an embodiment.

FIG. 7 illustrates an example user interface displaying compaction tables imported into a seismic-to-simulation software program. The output of the software program can be input into reservoir modeling processes and/or workflows. The compaction tables shown can represent different deformation regions.

Figure 8:
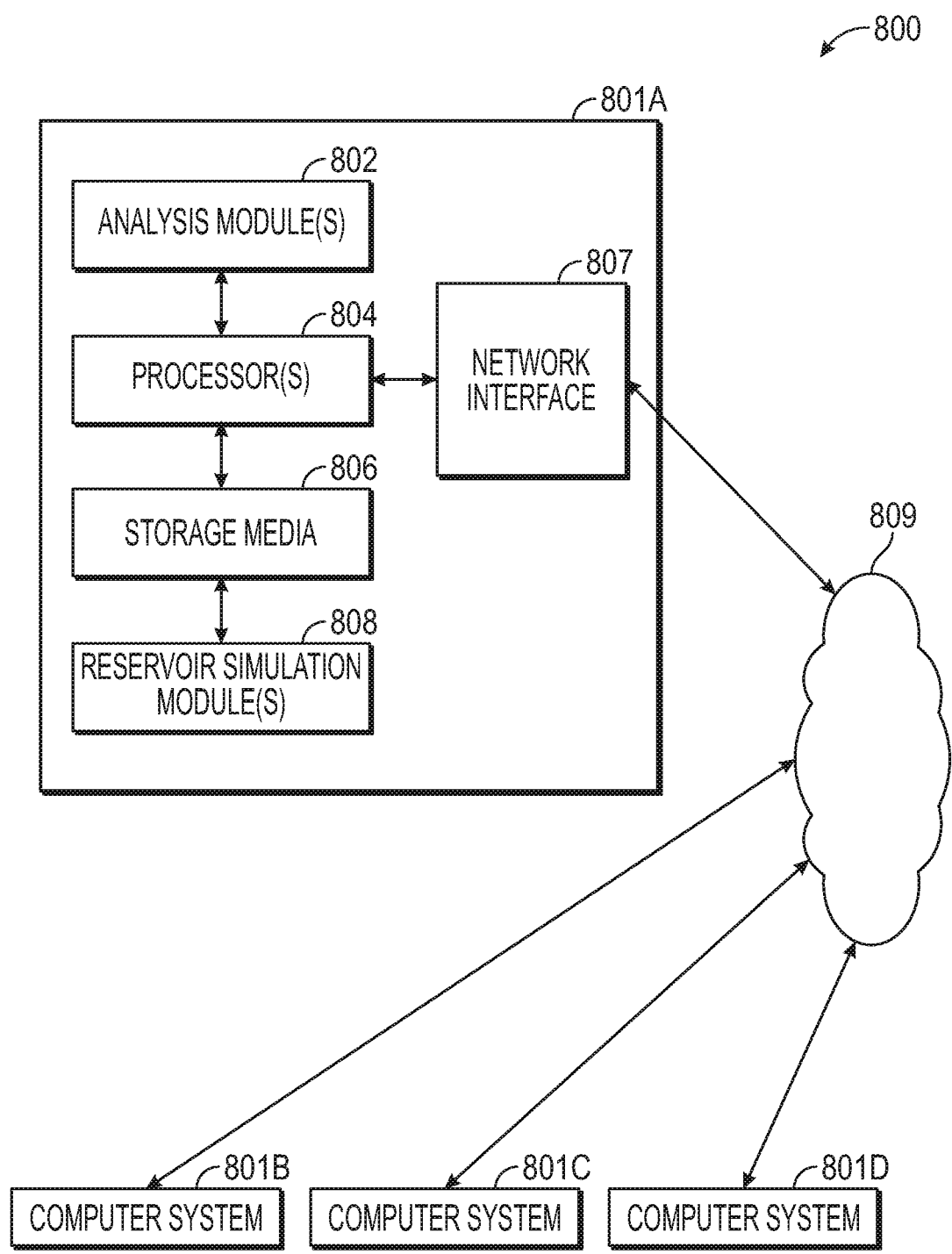
FIG. 8 depicts an illustrative computing system, according to an embodiment.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. In various embodiments, the computer system 801A can implement a cloud computing environment. The computer system 801A includes one or more analysis modules 802 that are configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents). In various embodiments, computing systems 801B, 801C, and/or 801D can represent computing systems utilized by users of the cloud computing environment.

A processor may include a microprocessor, microcontroller, processor module or subsystem, programmable integrated circuit, programmable gate array, or another control or computing device.

The storage media 806 may be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that instructions may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 800 contains one or more reservoir simulation module(s) 808. In the example of computing system 800, computer system 801A includes the reservoir simulation module 808. In some embodiments, a single reservoir simulation module may be used to perform some aspects of one or more embodiments of the methods disclosed herein. In other embodiments, a plurality of reservoir simulation modules may be used to perform some aspects of methods herein.

It should be appreciated that computing system 800 is one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included in various embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are described herein is illustrative and the order may be re-arranged, and/or two or more elements may occur simultaneously. The embodiments were chosen and described in order to explain the principals of the invention and its practical applications, to thereby enable others skilled in the art to utilize the described embodiments with various modifications as are suited to the particular use contemplated.

What is claimed is:

1. A method for modeling a subterranean volume, comprising:

obtaining data representing one or more physical characteristics of the subterranean volume;

generating a geomechanical model of the subterranean volume using the data, wherein the geomechanical model represents one or more geomechanical characteristics of the subterranean volume;

calculating strains, stresses, or both resulting from pressure changes in the subterranean volume using the geomechanical model;

determining one or more local correlations between pressure changes and changes in permeability, porosity, or both in the subterranean volume using the calculated strains and stresses, the determining the one or more local correlations comprising:

calculating derivatives of strain versus pressure, the calculating including calculating a slope of normal strain over pressure by dividing the normal strain by pressure change, and calculating a slope of shear strain over the pressure by dividing the shear strain by the pressure change;

generating one or more compaction tables for the subterranean volume using the local correlations;

calculating pressure changes in the subterranean volume by simulating fluid flow in the subterranean volume using a reservoir model; and modifying the reservoir model using the one or more compaction tables and the calculated pressure changes, wherein the one or more local correlations represent a relationship between pressure depletion, the normal strain, and the shear strain in the subterranean volume.

2. The method of claim 1, wherein the compaction tables relate pressure to porosity and/or permeability in individual cells or groups of cells in the reservoir model of the subterranean volume.

3. The method of claim 1, wherein the one or more local correlations are specified for individual cells of the subterranean volume in the reservoir model, the geomechanical model, or both.

4. The method of claim 1, further comprising again simulating fluid flow in the subterranean volume using the modified reservoir model.

5. The method of claim 1, wherein the data is collected using one or more physical devices positioned in a well or on a surface proximal to the subterranean volume.

6. The method of claim 1, wherein the one or more local correlations represent a relationship between pressure depletion and the normal strain and between pressure depletion and the shear strain in the subterranean volume.

7. The method of claim 1, wherein the determining the one or more local correlations further comprises calculating the normal strain and the shear strain of fractures, respectively, based on multiplying the slope of the normal strain over the pressure by a result of subtracting an initial pressure for apertures of the fractures from the pressure, and by multiplying the slope of the shear strain over the pressure by the result of the subtracting the initial pressure for the apertures of the fractures from the pressure.

8. The method of claim 7, wherein the determining the one or more local correlations further comprises predicting changes in pressure using the formula: $\Delta a(P)=f(\dot{\varepsilon}n)(P-Po)+g(\dot{\varepsilon}s)(P-Po)$, where f and g are functions relating changes in the normal strain and the shear strain to the changes in aperture.

9. The method of claim 8, wherein the predicting the changes in aperture comprises predicting changes in pressure depletion using the formula: $\Delta a(Dp)=sDp\ (\dot{\varepsilon}n*\varepsilon n+\theta(\phi)*\dot{\varepsilon}s*\varepsilon s)$, where s is a characteristic spacing of discontinuities, phi is the dilation angle, and theta(phi) is a function that depends on cumulated strain and describes an effective dilation of one or more fractures.

10. The method of claim 8, wherein computing the permeability changes comprises employing a cubic law for permeability-aperture in planar fractures.

11. A non-transitory computer-readable medium storing instructions that, when executed by at least one processor of a computing system, cause the computing system to perform operations comprising:

obtaining data representing one or more physical characteristics of a subterranean volume;

generating a geomechanical model of the subterranean volume using the data, wherein the geomechanical model represents one or more geomechanical characteristics of the subterranean volume;

calculating strains, stresses, or both resulting from pressure changes in the subterranean volume using the geomechanical model;

determining one or more local correlations between pressure changes and changes in permeability, porosity, or both in the subterranean volume using the calculated strains and stresses, the determining the one or more local correlations comprising:

calculating derivatives of strain versus pressure, the calculating including calculating a slope of normal strain over pressure by dividing the normal strain by pressure change, and calculating a slope of shear strain over the pressure by dividing the shear strain by the pressure change;

generating one or more compaction tables for the subterranean volume using the local correlations;

calculating pressure changes in the subterranean volume by simulating fluid flow in the subterranean volume using a reservoir model; and modifying the reservoir model using the one or more compaction tables and the calculated pressure changes, wherein the one or more local correlations represent a relationship between pressure depletion, the normal strain, and the shear strain in the subterranean volume.

12. The medium of claim 11, wherein the compaction tables relate pressure to porosity and/or permeability in individual cells or groups of cells in the reservoir model of the subterranean volume.

13. The medium of claim 11, wherein the one or more local correlations are specified for individual cells of the subterranean volume in the reservoir model, the geomechanical model, or both.

14. The medium of claim 11, wherein the operations further comprise again simulating fluid flow in the subterranean volume using the modified reservoir model.

15. The medium of claim 11, wherein the data is collected using one or more physical devices positioned in a well or on a surface proximal to the subterranean volume.

16. The medium of claim 11, wherein the determining the one or more local correlations further comprises calculating the normal strain and the shear strain of fractures, respectively, based on multiplying the slope of the normal strain over the pressure by a result of subtracting an initial pressure for apertures of the fractures from the pressure, and by multiplying the slope of the shear strain over the pressure by the result of the subtracting the initial pressure for the apertures of the fractures from the pressure.

17. A computing system comprising:
one or more processors; and
a memory system comprising one or more non-transitory computer-readable media storing instructions that, when executed by at least one of the one or more processors, cause the computing system to perform operations comprising:

obtaining data representing one or more physical characteristics of a subterranean volume;

generating a geomechanical model of the subterranean volume using the data, wherein the geomechanical model represents one or more geomechanical characteristics of the subterranean volume;

calculating strains, stresses, or both resulting from pressure changes in the subterranean volume using the geomechanical model;

determining one or more local correlations between pressure changes and changes in permeability, porosity, or both in the subterranean volume using the calculated strains and stresses, the determining the one or more local correlations comprising:

calculating derivatives of strain versus pressure, the calculating including calculating a slope of normal strain over pressure by dividing the normal strain by pressure change, and calculating a slope of shear strain over the pressure by dividing the shear strain by the pressure change;

generating one or more compaction tables for the subterranean volume using the local correlations;

calculating pressure changes in the subterranean volume by simulating fluid flow in the subterranean volume using a reservoir model; and modifying the reservoir model using the one or more compaction tables and the calculated pressure changes, wherein the one or more local correlations represent a relationship between pressure depletion, the normal strain, and the shear strain.

18. The system of claim 17, wherein the compaction tables relate pressure to porosity and/or permeability in individual cells or groups of cells in the reservoir model of the subterranean volume.

19. The system of claim 17, wherein the one or more local correlations are specified for individual cells of the subterranean volume in the reservoir model, the geomechanical model, or both.

20. The system of claim 17, wherein the operations further comprise again simulating fluid flow in the subterranean volume using the modified reservoir model.

21. The computing system of claim 17, wherein the determining the one or more local correlations further comprises calculating normal strain and the shear strain of fractures, respectively, based on multiplying the slope of the normal strain over the pressure by a result of subtracting an initial pressure for apertures of the fractures from the pressure, and by multiplying the slope of the shear strain over the pressure by the result of the subtracting the initial pressure for the apertures of the fractures from the pressure.

22. The computing system of claim 17, wherein the data is collected using one or more physical devices positioned in a well or on a surface proximal to the subterranean volume.

* * * * *